(12) United States Patent
Haberl

(10) Patent No.: US 9,696,544 B2
(45) Date of Patent: Jul. 4, 2017

(54) HEADS UP DISPLAY SYSTEM HAVING DUAL FRESNEL LENS MAGNIFICATION

(71) Applicant: Toyota Motor Engineering & Manufacturing North America, Inc., Erlanger, KY (US)

(72) Inventor: Samuel T. Haberl, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/838,657

(22) Filed: Aug. 28, 2015

(65) Prior Publication Data

US 2017/0059859 A1    Mar. 2, 2017

(51) Int. Cl.
| | |
|---|---|
| *G02B 27/14* | (2006.01) |
| *G09G 5/00* | (2006.01) |
| *G02B 27/01* | (2006.01) |
| *G02B 3/08* | (2006.01) |
| *B60K 35/00* | (2006.01) |

(52) U.S. Cl.
CPC .......... *G02B 27/0101* (2013.01); *B60K 35/00* (2013.01); *G02B 3/08* (2013.01); *B60K 2350/2052* (2013.01); *B60K 2350/352* (2013.01); *G02B 2027/011* (2013.01); *G02B 2027/014* (2013.01); *G02B 2027/0141* (2013.01)

(58) Field of Classification Search
CPC ............................. G02B 27/0101; G02B 3/08; G02B 2027/014; G02B 2027/011; G02B 2027/0141; B60K 35/00; B60K 2350/352; B60K 2350/2052

USPC .................................. 359/630–632; 345/7–9
See application file for complete search history.

(56) References Cited

U.S. PATENT DOCUMENTS

| | | |
|---|---|---|
| 4,318,594 A | 3/1982 | Hanada |
| 5,013,135 A | 5/1991 | Yamamura |
| 5,237,451 A | 8/1993 | Saxe |
| 5,436,763 A | 7/1995 | Chen et al. |
| 5,790,322 A | 8/1998 | Kameda et al. |
| 7,210,632 B2 | 5/2007 | Gofman et |
| 7,924,687 B2 | 4/2011 | Sun et al. |
| 8,289,229 B2 | 10/2012 | Ishikawa et al. |
| 2002/0080495 A1 | 6/2002 | Anderson |
| 2007/0053275 A1 | 3/2007 | Sun |
| 2008/0068296 A1* | 3/2008 | Lind .................. G02B 27/0101 345/9 |

OTHER PUBLICATIONS

J. Alejandro Betancur. Physical Variable Analysis Involved in Head-Up Display Systems Applied to Automobiles, Augmented Reality—Some Emerging Application Areas, Dr. Andrew Yeh Ching Nee (Ed.), ISBN: 978-953-307-422-1, InTech (2011) pp. 243-266.

* cited by examiner

*Primary Examiner* — Alicia M Harrington
(74) *Attorney, Agent, or Firm* — Dinsmore & Shohl LLP

(57) ABSTRACT

A heads up display system is provided for an automotive vehicle. The automotive vehicle includes an instrument panel and a windshield. The heads up display providing a first reflective mirror, a second reflective mirror, a first Fresnel lens, a second Fresnel lens, and an image display generator. The first Fresnel lens has a concave shape. The first Fresnel lens is positioned downstream of the first reflection mirror and the second reflection mirror. The second Fresnel lens has a convex shape. The second Fresnel lens is positioned downstream of the first Fresnel lens.

20 Claims, 7 Drawing Sheets

HEADS UP DISPLAY SYSTEM HAVING DUAL FRESNEL LENS MAGNIFICATION

FIELD OF THE INVENTION

The present invention is directed to a heads up display (HUD) system, more particularly, to a HUD system incorporating the use of dual Fresnel lenses for magnification.

BACKGROUND OF THE INVENTION

In modern automotive vehicles it is known to display a projected image on a windshield utilizing a heads up display (HUD). The displayed image allows a driver to obtain vital vehicular information without deviating visual focus from the road. The vital vehicular information includes vehicle speed, rpms, turn signal indicators, fuel levels, state of charge, and warning indicators.

As the projected image includes vital information, it is important that the projected image be of sufficient size to allow a driver to easily recognize the projected information.

In previous configurations, the size of the projected image was increased by shifting the entire HUD system along an axis of display onto the windshield such that the HUD system moved farther away from the windshield on the display axis. However, as modern automotive vehicles become more complex, packaging constraints are reduced such that the HUD system is required to maintain a certain distance from the windshield.

Although it is known to utilize Fresnel lenses to magnify an image, there is a particular disadvantage in such use. Specifically, the Fresnel lens by its nature is known to distort an image thereby reducing the overall quality of the magnified image. As such, utilizing a Fresnel lens to magnify a projected image in a HUD system reduces the overall quality of the image projected on the windshield screen which reduces customer satisfaction and the aesthetically pleasing appearance of the HUD system itself.

Thus, there exists a need in the art to improve the previously known HUD system so as to provide a magnified image on the windshield while maintaining a packaging constraint and image quality.

SUMMARY OF THE INVENTION

The present invention provides an improved heads up display which overcomes the above mentioned disadvantages of the previously known HUD systems which lack the ability to increase the size of the projected image while maintaining a packaging constraint.

In brief, a heads up display is provided for an automotive vehicle. The automotive vehicle having an instrument panel and a windshield. The heads up display providing a first reflective mirror, a second reflective mirror, a first Fresnel lens, a second Fresnel lens, and an image display generator. The first Fresnel lens has a concave shape. The first Fresnel lens is positioned downstream of the first reflection mirror and the second reflection mirror. The second Fresnel lens has a convex shape. The second Fresnel lens is positioned downstream of the first Fresnel lens.

The image display generator is positioned upstream of the first reflection mirror and the second reflection mirror. The image display generator generates an image that is reflected on the first reflection mirror and the second reflection mirror. The image generated by the image display generator is magnified by the first Fresnel lens and the second Fresnel lens before being displayed on the windshield.

Additionally, the image generated by the image display generator is generated with a partial distortion along an axis of the image. The distortion generated by the image display generator corresponds to a distortion applied by the first Fresnel lens such that the first Fresnel lens resolves the distortion generated in the generated image by the image display generation device.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

The present invention has utility as a HUD system for an automotive vehicle that is able to magnify a projected image while maintaining a packaging constraint. Specifically, the HUD system is provided with an image generator device, a reflection portion, and a magnification portion. The image display generator displays an image which is projected onto the reflection portion. The reflection portion reflects the projected image into the magnification portion. The magnification portion is provided downstream of the reflection portion. The magnification portion magnifies the image projected by the image generator device and reflected by the reflective portion. The magnified image is then projected onto a windshield of the automotive vehicle.

By providing the magnification portion downstream of the reflection portion, allows magnification of the projected image while maintaining the HUD system within the packaging constraint. Specifically, the distance between the HUD system and the windshield, along a display axis, can be reduced as the magnification portion magnifies the projected image.

As the magnification portion is formed of a first Fresnel lens and a second Fresnel lens, provided downstream of the first Fresnel lens, the projected image is distorted by the first and second Fresnel lens. Therefore, the image display generation device generates an image that is distorted to correspond to the distortion caused by the Fresnel lenses. Specifically, the initially generated image is distorted such that upon magnification by the Fresnel lenses, the distortion removed by the distortion by the Fresnel lenses. As such, the magnified image projected onto the windshield is provided without distortion.

Figure 1:
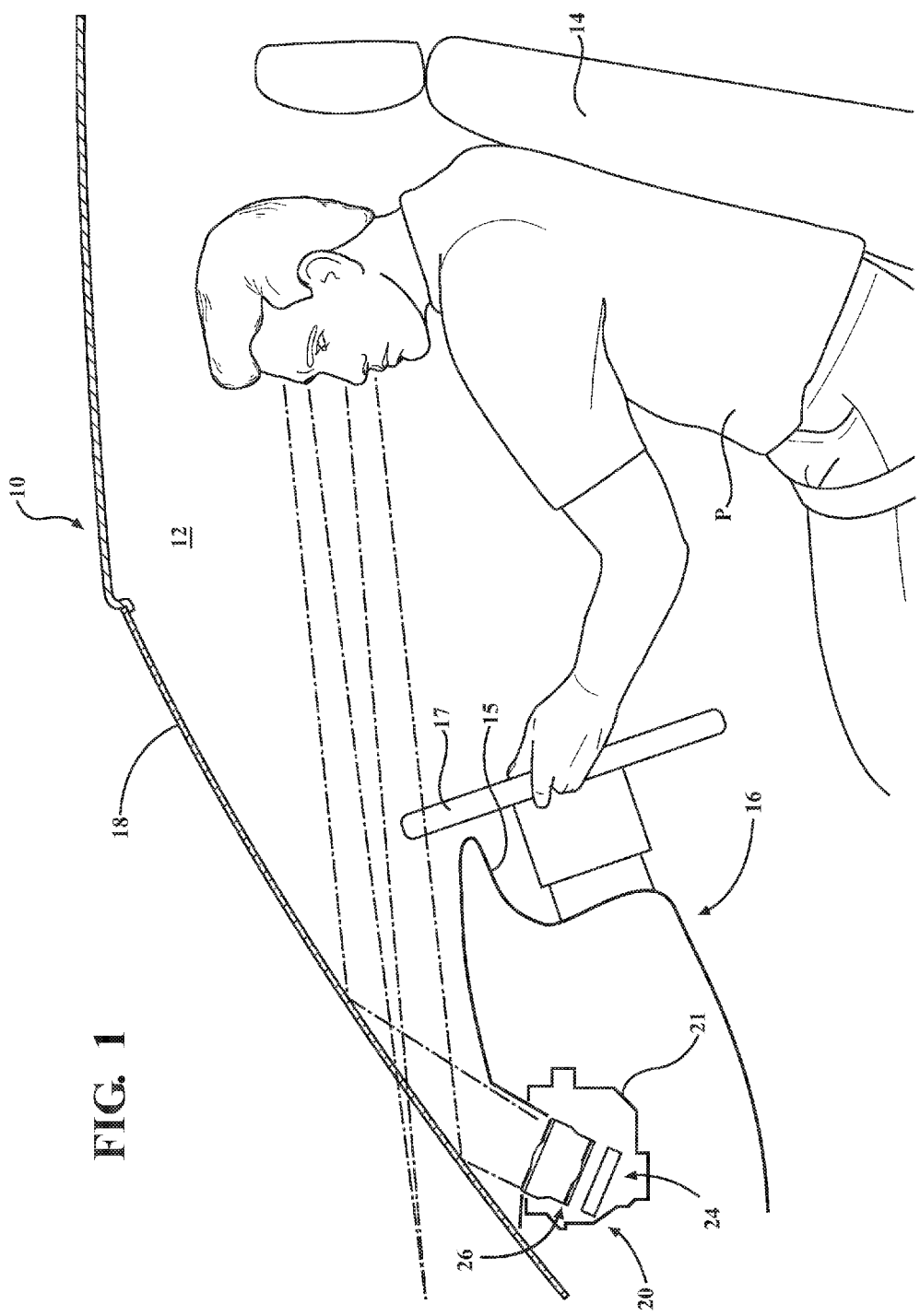
FIG. 1 is a cross-sectional view of an automotive vehicle having a HUD system.

As illustrated in FIG. 1, an automotive vehicle is generally illustrated at 10. The automotive vehicle 10 includes a passenger compartment 12. In the passenger compartment 12, a driver's seat 14, for supporting an occupant P, is provided rearward, in the vehicle longitudinal direction, of an instrument panel 16. The instrument panel 16 includes an instrument cluster hood 15 which overhangs vehicular instruments and a steering wheel 17. Positioned forward of the instrument panel 16 is the front windshield 18.

A heads up display (HUD) 20 is provided in the instrument panel 16 rearward of a junction between the instrument panel 16 and the front windshield 18. The HUD system 20 is provided with a packaging constraint 21. The packaging constraint 21 represents a restriction on available space for the HUD system 20 to occupy.

The HUD system 20 includes an image display generator device 22, a reflection portion 24, and a magnification portion 26. The reflection portion 24 is positioned downstream of the image display generator device 22. The magnification portion 26 is positioned downstream of the reflection portion 24, and consequently, the image display generator device 22.

Figure 2:
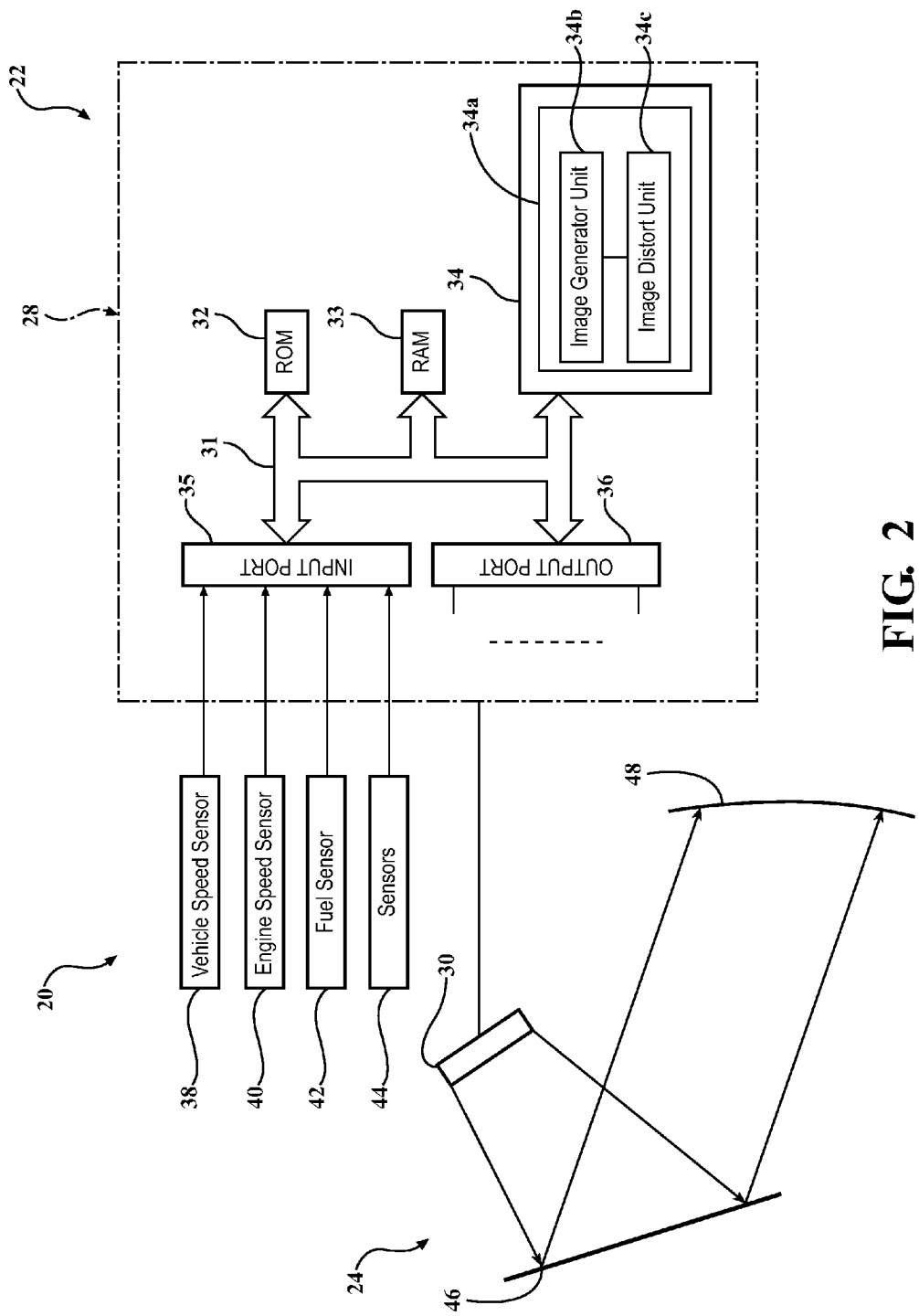
FIG. 2 is a schematic diagram illustrating the image display generator device and the reflection portion of the HUD system.

With reference to FIG. 2, the image display generation device 22 and the reflection portion 24 will be discussed. The image display generation device 22 includes an electronic control unit 28 and a display device 30.

The electronic control unit 28 is comprised of a digital computer provided with a ROM (read only memory) 32, a RAM (random access memory) 33, a CPU (microprocessor) 34, an input port 35, and an output port 36. The ROM 32, RAM 33, CPU34, input port 35, and output port 36 are connected with each other by a bidirectional bus 31.

The vehicle 10 is provided with a vehicle speed sensor 38, an engine speed sensor 40, a fuel sensor 42, and other sensors 44. The other sensor 44 is optionally a turn signal indicator sensor, a headlamp indicating sensor, or an engine malfunction indicator. The output signals of the vehicle speed sensor 38, engine speed sensor 40, fuel sensor 42, and other sensors 44 are input into the electronic control unit through the input port 35.

The CPU 34 includes a storage device 34a, such as a nonvolatile storage device. Stored within the storage device 34a is an image generator unit 34b, and an image distort unit 34c. The image generator unit 34b receives the various inputs from the vehicle speed sensor 38, engine speed sensor 40, fuel sensor 42, and other sensors 44. The image generator unit 34b generates a display image to be projected by the HUD system 20, based on a predetermined display format and the output of the sensors.

The image generated by the image generator unit 34b is then distorted by the image distort unit 34c. As will be described in greater detail below, the image distort unit 34c distorts the image generated by the image generator unit 34b such that the display image is distorted to correspond to a predetermined distortion stored within the storage device 34a. The predetermined distortion corresponds to the distortion caused by the magnification portion 26. Specifically, the distortion that the projected image will undergo during magnification by the Fresnel lenses.

The predetermined distortion is dependent upon the specific configuration of the magnification portion 26. Specifically, the predetermined distortion is dependent upon the specific shape, size, and configuration of the Fresnel lenses. The predetermined distortion is configured to cancel the distortion caused by the Fresnel lenses. Persons skilled in the art understand the experiment techniques needed to generate a predetermined distortion to cancel the distortion caused by the Fresnel lenses.

The CPU 34 outputs the distorted image from the electronic control unit 28, through the output port 36, to the display device 30. The display device 30 displays and projects the distorted image. The display device 30 is optionally a LCD monitor, thin film transistor liquid crystal display (TFT-LCD), or any other type of projector device capable of displaying and projecting the distorted image.

The display device 30 projects the distorted image to the reflection portion 24. The reflection portion 24 includes a first reflection mirror 46 and a second reflection mirror 48. The first reflection mirror 46 is provided downstream of the display device 30 and upstream of the second reflection mirror 48. The first reflection mirror 46 is what is commonly known as a fold mirror which reflects the projected image from the display device 30 so as to reduce a packaging size of the HUD system 20. The first reflection mirror 46 reflects the distorted image onto the second reflection mirror 48.

The second reflection mirror 48 is what is commonly known as the rotating or anti-spherical mirror. The second reflection mirror 48 reflects the distorted image to the magnification portion 26.

The second reflection mirror 48 has a curvature which distorts the projected image to correspond to the distortion caused by the curvature of the front windshield 18. In order to clarify the disclosure, the distortion caused by the second reflection mirror 48 will not be discussed.

As such, the display device 30 displays the distorted image which is projected onto the first reflection mirror 46. The first reflection mirror 46 reflects the distorted image onto the second reflection mirror 48 which reflects the distorted image towards the magnification portion 26.

Figure 3:
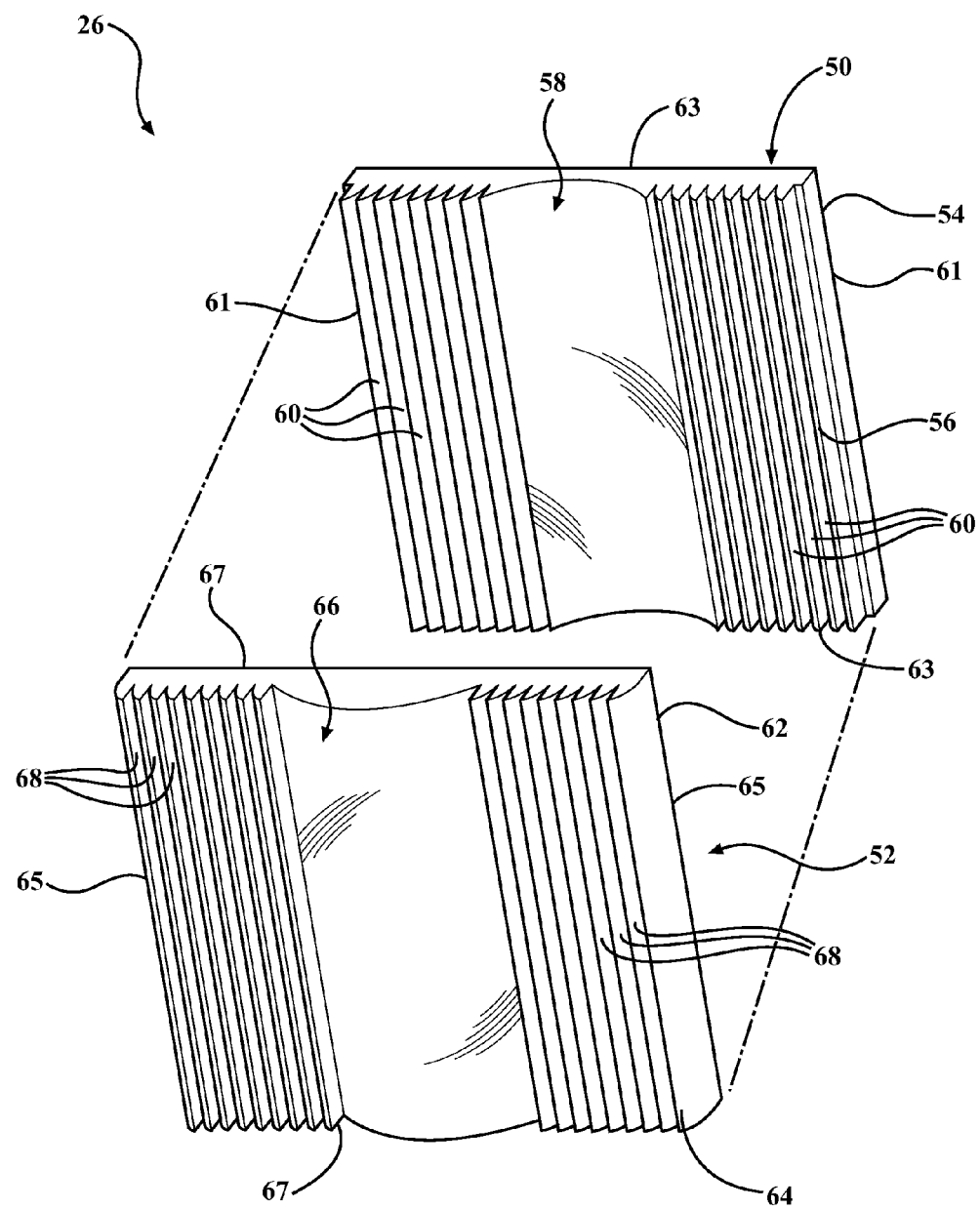
FIG. 3 is a perspective view illustrating the magnification portion having dual one directional Fresnel lens.

With reference to FIG. 3, the magnification portion 26 will be described in greater detail. The magnification portion 26 includes a first Fresnel lens 50 and a second Fresnel lens 52. The first Fresnel lens 50 is positioned downstream of the reflection portion 24. Specifically, the first Fresnel lens 50 is positioned downstream of the second reflective mirror 48. The second Fresnel lens 52 is provided downstream of the first Fresnel lens 50.

In the illustrated embodiment, the first Fresnel lens 50 is a one dimensional and one sided Fresnel lens. As the first Fresnel lens 50 is a one dimensional Fresnel lens, the magnification and correction of the distorted image will be along an axis of the image.

Figure 4:
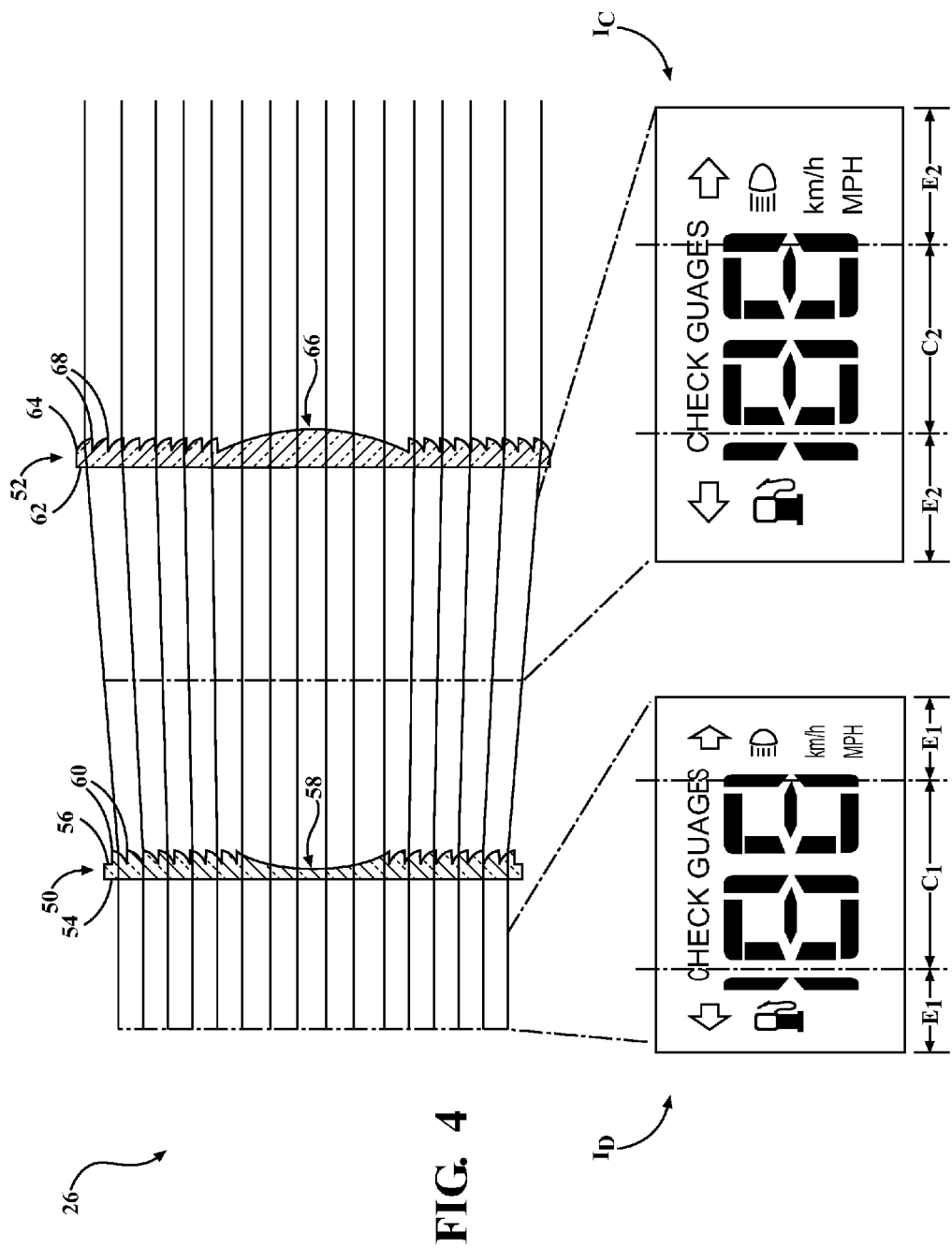
FIG. 4 is a schematic diagram illustrating the magnification and image distortion correction by the magnification portion of the HUD system.

The first Fresnel lens 50 has a flat upstream side 54 and an opposite concave downstream side 56. Specifically, the concave downstream side 56 of the first Fresnel lens 50 is provided with a central concave portion 58 that extends in a vertical direction. Provided on either side of the central concave portion 58 are a plurality of linear concave corrugations 60, as best illustrated in FIGS. 3 and 4. The plurality of linear concave corrugations 60 extend vertical and parallel across the horizontal of the first Fresnel lens 50.

The first Fresnel lens 50 magnifies and distorts the projected image; however, as discussed in greater detail below, the projection of an image having the predetermined distortion which corresponds to the distortion caused by the Fresnel lens magnification, corrects the distortion to display the desired the image.

The plurality of linear concave corrugations 60 extend from a first pair of edges 61 of the first Fresnel lens 50 to the central concave portion 58. The central concave portion 58 extends between a second pair of edges 63 of the first Fresnel lens 50. The first pair of edges 61 are positioned on the horizontal sides of the first Fresnel lens 50 and the second pair of edges 63 are positioned on the vertical sides of the first Fresnel lens 50.

The second Fresnel lens 52 is a one dimensional and one sided Fresnel lens. The second Fresnel lens 52 has a flat upstream side 62 and an opposite convex downstream side 64. Specifically, the convex downstream side 64 of the second Fresnel lens 52 is provided with a central convex portion 66 that extends in a vertical direction. Provided on either side of the central convex portion 66 are a plurality of linear convex corrugations 68, as best illustrated in FIGS. 3 and 4. The plurality of linear convex corrugations 68 extend vertical and parallel across the horizontal of the second Fresnel lens 52.

The second Fresnel lens 52 converges and collimates the magnified image from the first Fresnel lens 50.

The plurality of linear convex corrugations 68 extend from a first pair of edges 65 of the second Fresnel lens 52 to the central convex portion 66. The central convex portion 66 extends between a second pair of edges 67 of the second Fresnel lens 52. The first pair of edges 65 are positioned on the horizontal sides of the second Fresnel lens 52 and the second pair of edges 67 are positioned on the vertical sides of the second Fresnel lens 52.

The magnification and correction of the distorted image through the magnification portion 26 will be discussed with reference to FIG. 4. As the magnification portion 26 utilizes a pair of one dimensional Fresnel lenses, the image generator unit 34b generates a distorted image $I_D$. The distorted image $I_D$ is provided with a central portion $C_1$, and a pair of edge portions $E_1$, provided on either side of the central portion $C_1$. The central portion $C_1$ is positioned to correspond to the central concave portion 58 of the first Fresnel lens 50. The pair of edge portions $E_1$ are positioned to correspond to the plurality of linear concave corrugations 60 provided on either side of the central concave portion 56.

As the central concave portion 58 is formed as a conventional lens. As such, the central portion $C_1$ passing through the central concave portion 58 undergoes minimal distortion while the remainder of the image is distorted by the predetermined distortion. Therefore, the central portion $C_1$ of the distorted image $I_D$ remains undistorted by the predetermined distortion caused by the image distort unit 34c.

As the distorted image $I_D$ passes through the first Fresnel lens 50 the image is magnified by extending the projections. Therefore, the pair of edge portions $E_1$ are distorted by the first Fresnel lens 50 corresponding to the predetermined distortion. Specifically, the magnification of the distorted image $I_D$ causes the portions of the image corresponding to the plurality of linear concave corrugations 60 to expand along one axis of the distorted image $I_D$. As the distorted image $I_D$ is projected through plurality of linear concave corrugations 60, the projection is expanded in the width direction of the distorted image $I_D$. Therefore, in order to maintain image quality the image distort unit 34c distorts the distorted image $I_D$ using the predetermined distortion to compress the edge portions $E_1$. Specifically, the distorted image $I_D$ is distorted by the image distort unit 34c such that the overall length of the pair of edge portions $E_1$ are decreased while maintaining the central portion $C_1$ without distortion.

The predetermined distortion distorts the image to form the distorted image $I_D$ such that the ratio of the widths of the edge portions $E_1$ compared to the central portion $C_1$, in the distorted image $I_D$, is smaller than the ratio of the widths of the edge portions $E_2$ compared to the central portion $C_2$ of the corrected image $I_C$.

As shown in FIG. 4, as the distorted image $I_D$ is projected through the first Fresnel lens 50, the image is magnified and corrected into the corrected image $I_C$ having a central portion $C_2$ and a pair of edge portions $E_2$ provided on either side of the central portion $C_2$. The central portion $C_2$ is equal to the central portion $C_1$. However, the each of the pair of edge portions $E_2$ is larger than each of the pair of edge portions $E_1$.

The predetermined distortion distorts the image to form the distorted image $I_D$ such that the ratio of the widths of the edge portions $E_1$ compared to the central portion $C_1$, in the distorted image $I_D$, is smaller than the ratio of the widths of the edge portions $E_2$ compared to the central portion $C_2$ of the corrected image $I_C$.

Specifically, the predetermined distortion compresses the edge portions $E_1$ of the distorted image $I_D$ as compared to the edge portions $E_2$ of the corrected image $I_C$.

By providing the image displayed by the display portion 30 with a distortion that corresponds, in opposition, to the distortion caused by the magnification of the first Fresnel lens 50 provides a HUD system 20 which can take advantage of the overall space saving factors of the Fresnel lens while avoiding image distortion that is typical of Fresnel lens magnification.

After the image is magnified and corrected by the first Fresnel lens 50, the corrected image $I_C$ is projected through the second Fresnel lens. The second Fresnel lens 52 having the convex downstream side 64 converges and collimates the magnified image from the first Fresnel lens 50. Upon convergence and collimation of the corrected image $I_C$ by the second Fresnel lens 52, the corrected image $I_C$ is projected onto the front windshield 18 for view by the occupant P.

Figure 5:
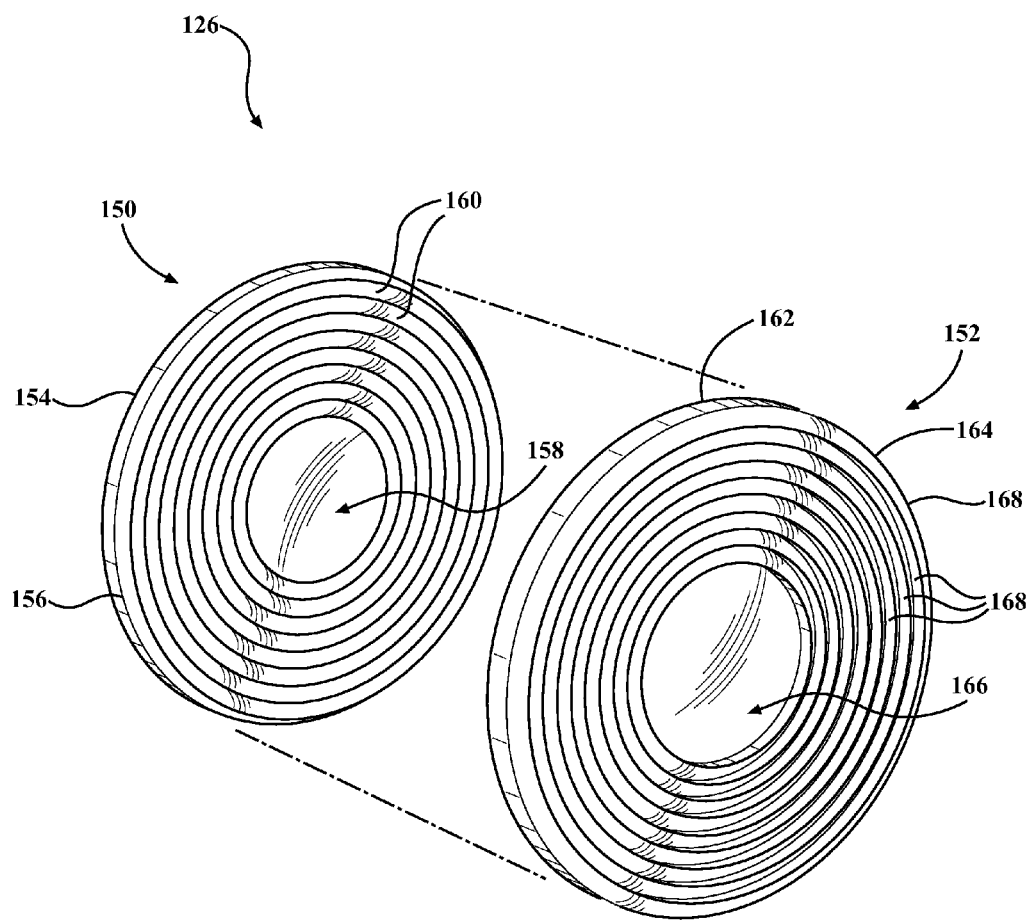
FIG. 5 is a perspective view illustrating an alternative magnification portion having dual two dimensional Fresnel lens.

With reference to FIG. 5, an alternative magnification portion is generally illustrated at 126. The magnification portion 126 includes a first Fresnel lens 150 and a second Fresnel lens 152.

The first Fresnel lens 150 is a two dimensional and one sided Fresnel lens. The first Fresnel lens 150 includes a flat upstream side 154 and an opposite concave downstream side 156. The concave downstream side 156 includes a central concave portion 158 which is surrounded by a plurality of annular concave corrugations 160. The plurality of annular concave corrugations 160 are provided concentric with the central concave portion 158.

As the first Fresnel lens 150 is a two dimensional Fresnel lens, the magnification and correction of the distorted image will be concentric about a center of the image.

The second Fresnel lens 152 is a two dimensional one and one sided Fresnel lens. The second Fresnel lens 152 includes a flat upstream side 162 and an opposite concave downstream side 164. The concave downstream side 164 includes a central convex portion 166 surrounded by a plurality of annular convex corrugations 168. The plurality of annular convex corrugations 168 are provided concentric with the central convex portion 166.

The magnification portion 126 operates in a similar manner as the magnification portion 26 except that the image distort unit 34c distorts the portion of the image that extends through the plurality of annular concave corrugations 160 and does not distort a circular central portion $C'_1$ of the image that extends through the central concave portion 158.

Figure 6:
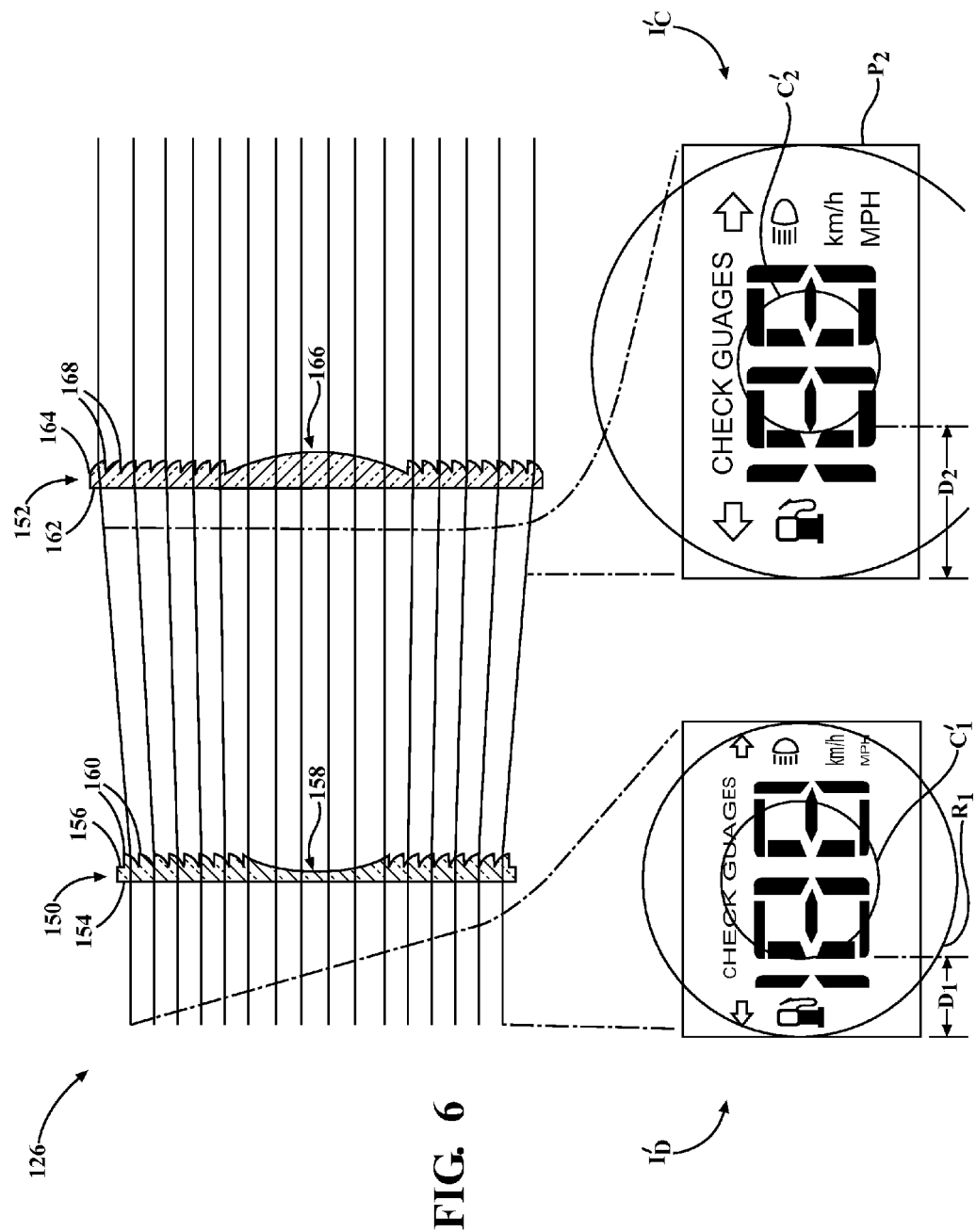
FIG. 6 is a schematic diagram illustrating the magnification and image distortion correction by the magnification portion.

With reference to FIG. 6, the image distort unit 34c distorts the image generated by the image generation unit 34b to provide the distorted image I'$_D$. The distorted image I'$_D$ is provided with a circular central portion C'$_1$, which corresponds to the portion of the image which will extend through the circular central concave portion 158. The circular central portion C'$_1$ remains undistorted.

However, the image distort unit 34c distorts the image, using the predetermined distortion to form the distorted image I'$_D$. In the distorted image I'$_D$ a concentric ring R$_1$ of the distorted image I'$_D$ is distorted by the predetermined distortion such that the distance between the exterior of the central portion C'$_1$ and the edge of the ring R$_1$ is decreased. Specifically, the distance D$_1$ between the central portion C1' and the ring R$_1$ is less than the distance between the central portion C'$_2$ and the ring R$_2$ in the corrected image I'$_C$. Moreover, the size of central portion C'$_1$ is equal to the size of the central portion C'$_2$ of the corrected image I'$_C$.

The predetermined distortion distorts the image to form the distorted image I'$_D$ such that the ratio of the distance of the ring R$_1$ compared to the central portion C'$_1$, in the distorted image I'$_D$, is smaller than the ratio of the distance of the ring R$_2$ compared to the central portion C'$_2$ of the corrected image I'$_C$.

Specifically, the predetermined distortion compresses the ring R$_1$ of the distorted image I'$_D$ as compared to the ring R$_2$ of the corrected image I'$_C$.

Figure 7:
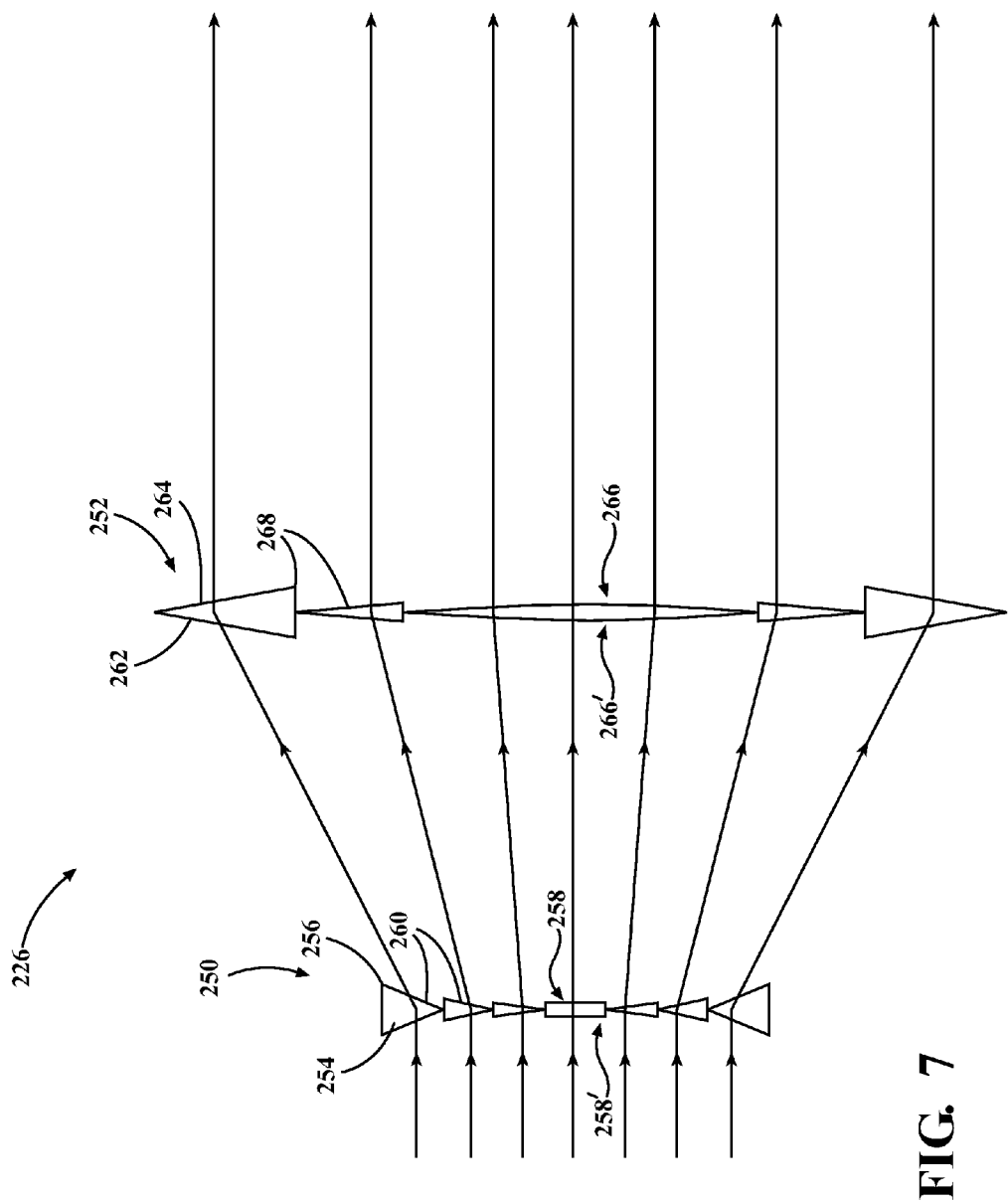
FIG. 7 is a schematic diagram illustrating another alternative magnification portion having dual two-sided Fresnel lens.

With reference to FIG. 7, another alternative magnification portion is generally illustrated at 226. The magnification portion 226 includes a first Fresnel lens 250 and a second Fresnel lens 252.

The first Fresnel lens 250 is a dual sided Fresnel lens. Specifically, the first Fresnel lens 250 includes a concave upstream side 254 having a concave shape and a concave downstream side 256 having a concave shape. Similarly, the second Fresnel lens 252 includes a convex upstream side 262 having a convex shape and a convex downstream side 264 having a convex shape. The magnification portion 226 is optionally a one dimensional Fresnel lens or a two dimensional Fresnel lens.

It is appreciated, of course, that the magnification and correction of the distorted image by the magnification of the first Fresnel lens, will be dependent upon the specific vehicles. As various vehicles will require different levels of magnification by the magnification portion, required magnification affects the distortion caused by the Fresnel lenses such that appropriate distortions of the image will typically be different for each vehicle model. Persons skilled in the art understand the techniques needed to generate appropriate Fresnel lens required for specific magnification and the distortion of the generated image to produce the distorted image ID which corresponds in opposition to the distortion caused by the Fresnel lens.

From the foregoing, it can be seen that the present invention provides a HUD system for magnifying a projected image using a Fresnel lens while avoiding distortion typical of Fresnel lens magnification. Having described the invention, however, many modifications thereto will become apparent to those skilled in the art without deviation from the spirit of the invention as defined by the scope of the appended claims.

It is claimed:

1. A heads up display system for an automotive vehicle having an instrument panel and a windshield, said heads up display comprising:
 a first reflection mirror;
 a second reflection mirror;
 a first Fresnel lens having a concave shape, the first Fresnel lens positioned downstream of the first reflection mirror and the second reflection mirror;
 a second Fresnel lens having a convex shape, the second Fresnel lens positioned downstream of the first Fresnel lens; and
 an image display generator positioned upstream of the first reflection mirror and the second reflection mirror, the image display generator generates an image that is reflected by the first reflection mirror and the second reflection mirror, and the image is magnified by the first Fresnel lens and the second Fresnel lens before being displayed on the windshield.

2. The heads up display system of claim 1, wherein the image generated by the image display generator is distorted by a predetermined distortion corresponding to a predetermined distortion caused by the first Fresnel lens.

3. The heads up display system of claim 2, wherein the predetermined distortion extends along one axis of the image, and wherein the first Fresnel lens distorts the image to resolve the distortion of the image generated by the image display generator.

4. The heads up display system of claim 3, wherein the predetermined distortion extends in a width direction of the image generated by the image display generator.

5. The heads up display system of claim 4, wherein the first Fresnel lens is a one dimensional Fresnel lens and the second Fresnel lens is a one dimensional Fresnel lenses.

6. The heads up display system of claim 5, wherein the first Fresnel lens includes a central concave portion and a plurality of linear concave corrugations provided on either side of the central concave portion.

7. The heads up display system of claim 6, wherein the second Fresnel lens includes a central convex portion and a plurality of linear convex corrugations provided on either side of the central convex portion.

8. The heads up display system of claim 7, wherein the predetermined distortion distorts only a portion of the image generated by the image display generator.

9. The heads up display of claim 8, wherein the portion of the image distorted by the predetermined distortion corresponds to the plurality of linear convex corrugations.

10. The heads up display system of claim 3, wherein the predetermined distortion extends concentric about a center of the image, and wherein the first Fresnel lens distorts the image to resolve the distortion of the image generated by the image display generator.

11. The heads up display system of claim 10, wherein a central portion of the image distorted by the predetermined distortion remains undistorted.

12. The heads up display system of claim 11, wherein the central portion of the image corresponds to a central concave portion of the first Fresnel lens.

13. The heads up display system of claim 9, wherein a central portion of the image is circular, and the predetermined distortion distorts a remainder of the image concentric with the central portion.

14. The heads up display system of claim 10, wherein the first Fresnel lens is a two dimensional Fresnel lens and the second Fresnel lens is a two dimensional Fresnel lens.

15. A heads up display system for an automotive vehicle having an instrument panel and a windshield, said heads up display comprising:
 a first reflection mirror;
 a second reflection mirror;
 a first Fresnel lens having a concave shape;

a second Fresnel lens having a convex shape, the second Fresnel lens positioned downstream of the first Fresnel lens; and an image display generator positioned upstream of the first Fresnel lens and the second Fresnel lens, the image display generator generates a distorted image having a predetermined distortion corresponding to a predetermined distortion caused by the first Fresnel lens, and the distorted image is magnified and corrected by the first Fresnel lens and the second Fresnel lens to form a corrected image before being displayed on the windshield.

16. The heads up display system of claim 15 further comprising:
   a first reflection mirror positioned downstream of the image display generator; and
   a second reflection mirror positioned downstream of the first reflection mirror and upstream of the first Fresnel lens and the second Fresnel lens;
   the first reflection mirror reflects the distorted image to the second reflection mirror which reflects the distorted image to the first Fresnel lens.

17. The heads up display system of claim 16, wherein the first Fresnel lens corrects the distorted image to form the corrected image by resolving the predetermined distortion of the distorted image.

18. The heads up display system of claim 17, wherein the image generated by the image display includes a central portion that remains undistorted.

19. The heads up display system of claim 18, wherein edge portions on either side of the central portion of the distorted image are distorted by the predetermined distortion.

20. The heads up display system of claim 19, wherein the central portion of the image is circular, and the predetermined distortion distorts a remainder of the image concentric with the central portion.

* * * * *